(12) United States Patent
Kobayashi et al.

(10) Patent No.: US 12,538,050 B2
(45) Date of Patent: Jan. 27, 2026

(54) PHOTOELECTRIC CONVERSION APPARATUS

(71) Applicant: CANON KABUSHIKI KAISHA, Tokyo (JP)

(72) Inventors: Hideo Kobayashi, Tokyo (JP); Takanori Suzuki, Tokyo (JP); Yuji Nakajima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 18/646,985

(22) Filed: Apr. 26, 2024

(65) Prior Publication Data

US 2024/0373148 A1 Nov. 7, 2024

(30) Foreign Application Priority Data

May 2, 2023 (JP) .................... 2023-076315

(51) Int. Cl.
*H04N 25/78* (2023.01)
*H03M 1/00* (2006.01)
*H03M 1/12* (2006.01)
*H04N 25/704* (2023.01)

(52) U.S. Cl.
CPC .............. *H04N 25/78* (2023.01); *H03M 1/00* (2013.01); *H03M 1/12* (2013.01); *H04N 25/704* (2023.01)

(58) Field of Classification Search
CPC ................ H04N 25/704; H04N 25/78; H03M 1/00–1/88
See application file for complete search history.

(56) References Cited

U.S. PATENT DOCUMENTS

| 7,990,440 | B2 | 8/2011 | Kobayashi |
| 9,407,847 | B2 | 8/2016 | Maehashi |
| 9,438,828 | B2 * | 9/2016 | Itano ............... H04N 25/77 |
| 9,509,931 | B2 | 11/2016 | Kobayashi |
| 9,602,752 | B2 | 3/2017 | Kobayashi |
| 10,015,430 | B2 | 7/2018 | Kobayashi |
| 10,297,633 | B2 | 5/2019 | Suzuki |
| 10,609,316 | B2 | 3/2020 | Kobayashi |
| 11,039,095 | B2 | 6/2021 | Ogawa |

(Continued)

FOREIGN PATENT DOCUMENTS

| JP | 2014-075847 A | 4/2014 |
| JP | 2019-057873 A | 4/2019 |

(Continued)

*Primary Examiner* — Lin Ye
*Assistant Examiner* — Chriss S Yoder, III
(74) *Attorney, Agent, or Firm* — Venable LLP

(57) ABSTRACT

A photoelectric conversion apparatus comprises a pixel region where pixels are arranged in a matrix, a sample hold circuit configured to sample and hold, as a first signal and a second signal, two different signals output from each of two pixels in the pixel region, and an analog-digital conversion circuit configured to perform analog-digital conversion of the second signals from the two pixels after performing analog-digital conversion of the first signals from the two pixels. A time interval between a period set to perform analog-digital conversion of the first signals from the two pixels and a period set to perform analog-digital conversion of the second signals from the two pixels is set longer than a time interval between periods set to perform analog-digital conversion of each of the first signals from the two pixels.

18 Claims, 8 Drawing Sheets

(56) References Cited

U.S. PATENT DOCUMENTS

| | | |
|---|---|---|
| 11,218,654 B2 | 1/2022 | Suzuki |
| 11,268,851 B2 | 3/2022 | Kobayashi |
| 11,323,648 B2 | 5/2022 | Matsuura |
| 11,418,749 B2 | 8/2022 | Moue |
| 11,431,929 B2 | 8/2022 | Kobayashi |
| 11,463,644 B2 | 10/2022 | Soda |
| 11,470,275 B2 | 10/2022 | Kobayashi |
| 11,496,704 B2 | 11/2022 | Sato |
| 11,616,925 B2 | 3/2023 | Kobayashi |
| 11,653,114 B2 | 5/2023 | Nakazawa |
| 11,688,755 B2 | 6/2023 | Kobayashi |
| 11,736,813 B2 | 8/2023 | Kobayashi |
| 11,800,253 B2 | 10/2023 | Saito |
| 11,843,880 B2 | 12/2023 | Kobayashi |
| 11,843,893 B2 | 12/2023 | Kobayashi |
| 11,910,116 B2 | 2/2024 | Kobayashi |
| 2020/0260034 A1 | 8/2020 | Moue et al. |
| 2020/0265909 A1 | 8/2020 | Matsuura |
| 2020/0322555 A1 | 10/2020 | Ogawa et al. |
| 2021/0274114 A1 | 9/2021 | Ogawa |
| 2021/0274119 A1* | 9/2021 | Nakamura ............ H04N 25/79 |
| 2022/0303484 A1 | 9/2022 | Kobayashi |
| 2022/0303486 A1 | 9/2022 | Kobayashi |
| 2023/0041974 A1 | 2/2023 | Kobayashi |
| 2023/0070568 A1 | 3/2023 | Kobayashi |
| 2023/0072715 A1 | 3/2023 | Kobayashi |
| 2023/0117988 A1 | 4/2023 | Kobayashi |
| 2023/0154963 A1 | 5/2023 | Kobayashi |
| 2023/0171514 A1 | 6/2023 | Kobayashi |
| 2023/0178580 A1 | 6/2023 | Yamazaki |
| 2023/0179890 A1 | 6/2023 | Kobayashi |
| 2023/0216459 A1 | 7/2023 | Kobayashi |
| 2023/0247332 A1 | 8/2023 | Kobayashi |
| 2023/0282654 A1 | 9/2023 | Kobayashi |
| 2024/0022838 A1 | 1/2024 | Muto |
| 2024/0064439 A1 | 2/2024 | Kobayashi |
| 2024/0080590 A1 | 3/2024 | Shimada |
| 2024/0080591 A1 | 3/2024 | Takahashi |
| 2024/0147096 A1 | 5/2024 | Kobayashi |
| 2024/0214704 A1 | 6/2024 | Kobayashi |

FOREIGN PATENT DOCUMENTS

| | | |
|---|---|---|
| WO | 2017/208638 A1 | 12/2017 |
| WO | 2019/069614 A1 | 4/2019 |

* cited by examiner

PHOTOELECTRIC CONVERSION APPARATUS

BACKGROUND OF THE INVENTION

Field of the Invention

The present invention relates to a photoelectric conversion apparatus.

Description of the Related Art

International Publication No. 2019/069614 (hereinafter PTL 1) describes a solid-state image capturing element including a delta-sigma (AZ) analog-digital conversion circuit. PTL 1 discloses a solid-state image capturing element capable of supporting a wide input voltage range by providing two capacitive elements, each of which stores a signal from a pixel, and outputting the weighted average of the voltages stored in two capacitive elements.

In some cases, signals from one pixel are read out in two parts, and the signal in each part undergoes analog-digital conversion and is output. In this case, if the voltage range of the signal in the first part is different from the voltage range of the signal in the second part, the digital signal conversion accuracy sometimes deteriorates in the analog-digital conversion.

SUMMARY OF THE INVENTION

One disclosed embodiment has been made in consideration of the above-described problem, and it is possible to provide a photoelectric conversion apparatus capable of suppressing deterioration of the conversion accuracy of analog-digital conversion upon performing analog-digital conversion on a signal from a pixel and outputting it.

According to one aspect of the disclosure, there is provided a photoelectric conversion apparatus comprising: a pixel region where pixels each including a photoelectric conversion element are arranged in a matrix; a sample hold circuit configured to sample and hold, as a first signal and a second signal, two different signals output from each of two pixels in the pixel region; and an analog-digital conversion circuit configured to perform analog-digital conversion of the second signals from the two pixels after performing analog-digital conversion of the first signals from the two pixels, wherein a time interval between a period set to perform analog-digital conversion of the first signals from the two pixels and a period set to perform analog-digital conversion of the second signals from the two pixels is set longer than a time interval between periods set to perform analog-digital conversion of each of the first signals from the two pixels.

Further features of the present invention will become apparent from the following description of exemplary embodiments with reference to the attached drawings.

DESCRIPTION OF THE EMBODIMENTS

Figure 1:
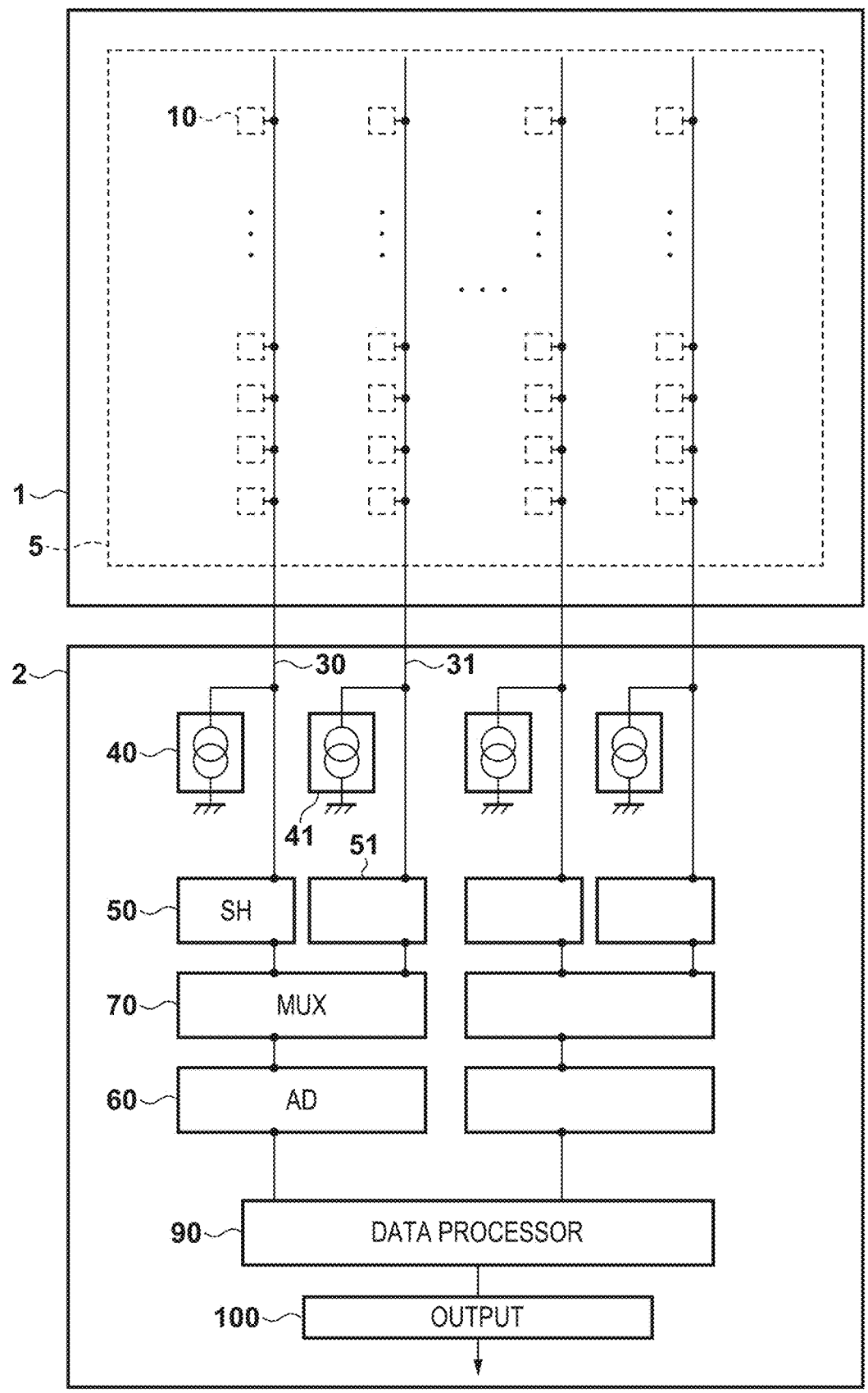
FIG. 1 is a schematic view of a photoelectric conversion apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

With reference to FIGS. 1 to 5, a photoelectric conversion apparatus according to the first embodiment will be described. FIG. 1 shows a pixel substrate 1, a circuit substrate 2, a pixel region 5, pixels 10, vertical signal lines 30 and 31, current sources 40 and 41, sample hold circuits 50 and 51, converters 60, multiplexers 70, a data processor 90, and an output circuit 100.

In the pixel region 5, a plurality of pixels 10, each including a photoelectric conversion element, are arranged in a matrix. Here, a row direction is a direction intersecting a direction in which the vertical signal lines 30 and 31 extend. The row direction indicates a horizontal direction in FIG. 1. A column direction is a direction in which the vertical signal line 30 and 31 extend. The column direction indicates a vertical direction in FIG. 1. Each pixel 10 includes a photoelectric conversion element, and generates signal charges corresponding to incident light.

In the pixel region 5, the vertical signal lines 30 and 31 are arranged along the pixel columns in correspondence with the columns (pixel columns) where the pixels 10 are arranged. Each of the vertical signal lines 30 and 31 can transfer, from the pixel 10 to the corresponding sample hold circuit 50 or 51, a signal corresponding to the signal charges generated by the photoelectric conversion element of the pixel 10. The current sources 40 and 41 can be arranged in correspondence with the vertical signal lines 30 and 31, respectively. Each of the current sources 40 and 41 can supply, via the corresponding vertical signal line 30 or 31, a bias current with respect to the pixel 10 selected to read out the signal.

Each of the sample hold circuits 50 and 51 samples and holds the signal generated by the photoelectric conversion element of each pixel 10 from the pixel region 5 via the corresponding vertical signal line 30 or 31. Each of the sample hold circuits 50 and 51 includes a sample hold circuit for sampling a signal obtained when the photoelectric conversion element is reset, and a sample hold circuit for sampling a signal obtained when a photoelectric conversion operation is performed in the photoelectric conversion element. The sample hold circuits 50 and 51 are connected to the vertical signal lines 30 and 31, respectively.

The multiplexer 70 connects one of the sample hold circuits 50 and 51 to the subsequent converter 60.

The converter 60 includes an analog-digital conversion circuit (A/D conversion circuit) that performs analog-digital conversion of the signals output from the sample hold circuits 50 and 51. As the A/D conversion circuit, a slope A/D conversion circuit, a successive approximation type A/D conversion circuit, a delta-sigma (ΔΣ) A/D conversion circuit, or the like can be used, but the A/D conversion circuit is not limited thereto.

The data processor 90 processes a digital signal output from the converter 60. The data processor 90 can perform correction processing, interpolation processing, or the like on the digital signal output from the converter 60. The output circuit 100 externally outputs the signal processed by the data processor 90.

Figure 2:
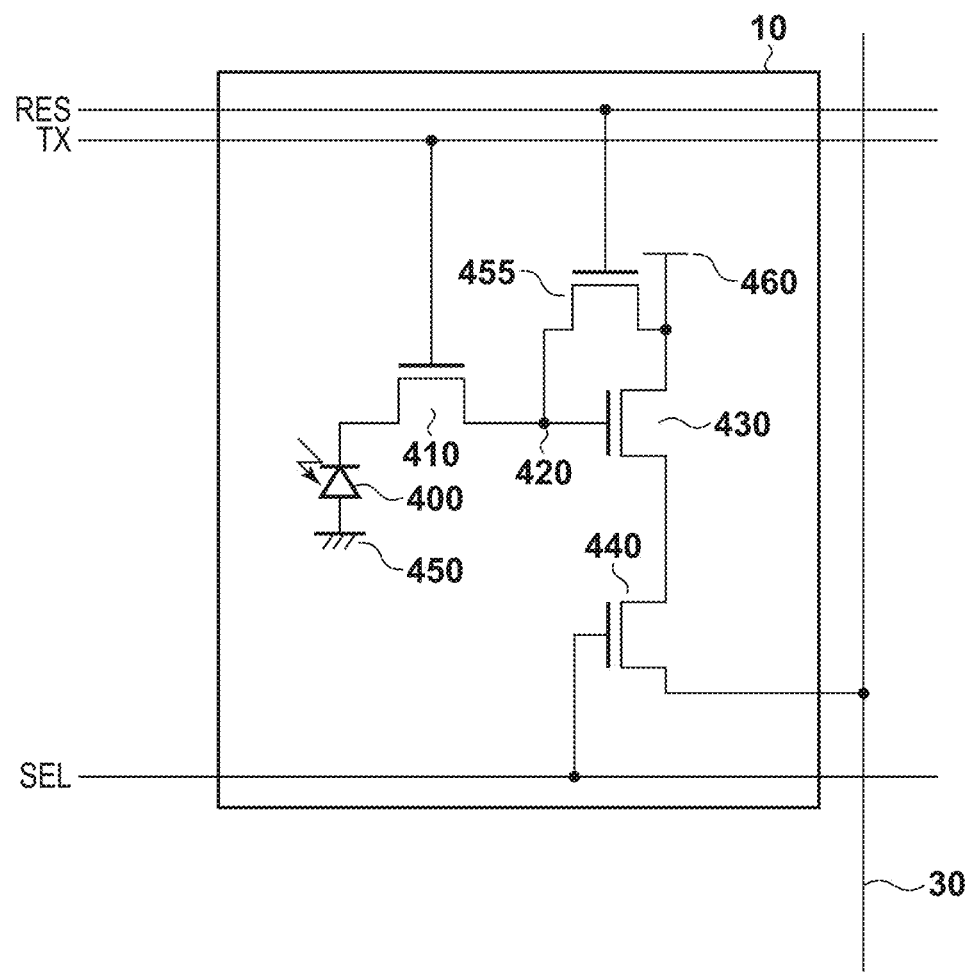
FIG. 2 is a view showing an example of the arrangement of a pixel according to the first embodiment.

FIG. 2 is a circuit diagram showing an example of the arrangement of the pixel 10. The pixel 10 includes a photoelectric conversion element 400, a transfer transistor 410, a reset transistor 455, an amplification transistor 430, and a selection transistor 440. The photoelectric conversion element 400 is, for example, a photodiode. One of the main electrodes of the photoelectric conversion element 400 is connected to a ground potential 450. The photoelectric conversion element 400 can photoelectrically converts received light into signal charges (for example, photoelectrons) of the charge amount corresponding to the amount of the received light, and accumulates the signal charges.

The other of the main electrodes of the photoelectric conversion element 400 is electrically connected to the gate electrode of the amplification transistor 430 via the transfer transistor 410. A node, to which the gate electrode of the amplification transistor 430 is electrically connected, functions as a floating diffusion 420. The floating diffusion 420 can operate as a charge-voltage converter that converts the signal charges generated by the photoelectric conversion element 400 into a signal voltage.

A transfer signal TX is supplied to the gate electrode of the transfer transistor 410. When the transfer transistor 410 is set in a conductive state in accordance with the transfer signal TX, the signal charges photoelectrically converted by the photoelectric conversion element 400 and accumulated in the photoelectric conversion element 400 are transferred to the floating diffusion 420.

The reset transistor 455 is connected between a power supply potential 460 and the floating diffusion 420. The expression here that "a transistor is connected between A and B" represents a state in which one of the main electrodes (source and drain) of the transistor is connected to A and the other of the main electrodes is connected to B. The gate electrode of the transistor is connected to neither A nor B.

A reset signal RES is supplied to the gate electrode of the reset transistor 455. When the reset transistor 455 is set in a conductive state in accordance with the reset signal RES, the potential of the floating diffusion 420 is reset to the power supply potential 460, and the charges held by the floating diffusion 420 can be swept out.

The gate electrode of the amplification transistor 430 is connected to the floating diffusion 420, one of the main electrodes thereof is connected to the power supply potential 460, and the other of the main electrodes is connected to the selection transistor 440. The gate electrode of the amplification transistor 430 can be the input section of a source follower that reads out the signal obtained from the photoelectric conversion by the photoelectric conversion element 400. That is, the other of the main electrodes of the amplification transistor 430 is connected to the vertical signal line 30 or 31 via the selection transistor 440. The amplification transistor 430 and the above-described current source 40 or 41 connected to the vertical signal line 30 or 31 form a source follower that converts the voltage of the floating diffusion 420 into the potential of the vertical signal line 30 or 31.

The selection transistor 440 is connected between the amplification transistor 430 and the vertical signal line 30 or 31. An example of connection to the vertical signal line 30 is shown here. A selection signal SEL is supplied to the gate electrode of the selection transistor 440. When the selection transistor 440 is set in a conductive state in accordance with the selection signal SEL, the pixel 10 is set in a selected state, and the signal is output from the amplification transistor 430 to the vertical signal line 30 or 31.

The circuit arrangement of the pixel 10 is not limited to the arrangement shown in FIG. 2. The selection transistor 440 may be connected between the power supply potential 460 and the amplification transistor 430. In the arrangement shown in FIG. 2, the pixel 10 includes the transfer transistor 410, the reset transistor 455, the amplification transistor 430, and the selection transistor 440, that is, the pixel 10 has a so-called four-transistor arrangement. However, the pixel 10 is not limited to this. For example, the pixel 10 may have a three-transistor arrangement in which the selection transistor 440 is omitted and the amplification transistor 430 also functions as the selection transistor. Alternatively, an arrangement with an increased number of transistors such as an arrangement including five transistors or more may be used. From the pixel 10, a reset signal obtained when the potential of the floating diffusion 420 is reset by the reset transistor 455 to reset the photoelectric conversion element 400 is output. In addition, a data signal at the signal level obtained when photoelectric conversion is performed by the photoelectric conversion element 400 is output. The reset signal and the data signal can be sequentially output from the pixel.

Figure 3:
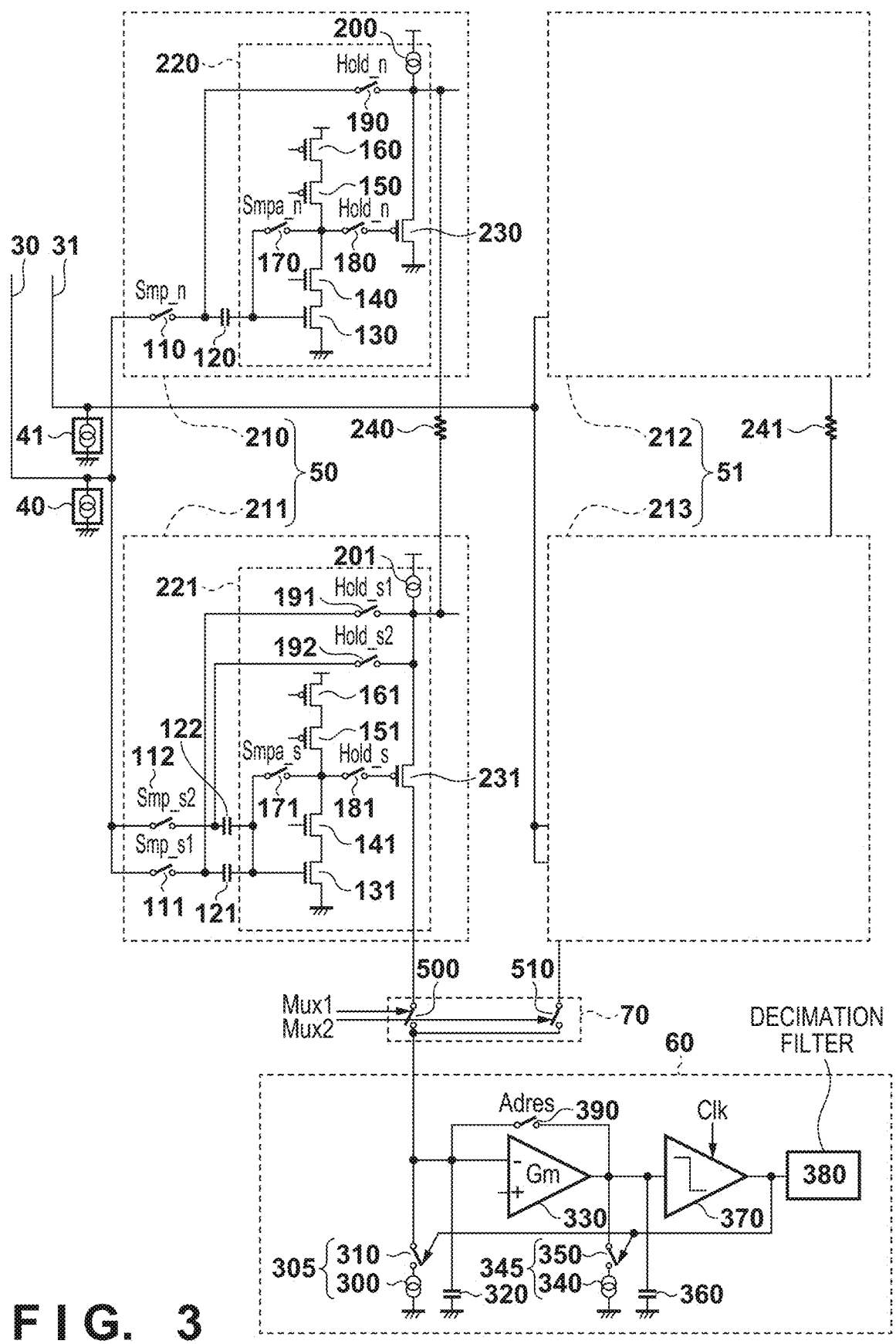
FIG. 3 is a schematic view of the photoelectric conversion apparatus according to the first embodiment.

FIG. 3 is a view showing an example of the circuit arrangement while focusing on the sample hold circuits 50 and 51, the converter 60, and the multiplexer 70. FIG. 3 shows the sample hold circuits 50 and 51 arranged in correspondence with the vertical signal lines 30 and 31, and the converter 60. A sample hold circuit 210 for sampling and holding the reset signal and a sample hold circuit 211 for sampling and holding the data signal, which are included in the sample hold circuit 50, are connected to one vertical signal line 30.

Further, a sample hold circuit 212 for sampling and holding the reset signal and a sample hold circuit 213 for sampling and holding the data signal, which are included in the sample hold circuit 51, are connected to one vertical signal line 31. One multiplexer 70 and one converter 60 are provided in correspondence with two sample hold circuits 50 and 51.

The sample hold circuit 210 includes a capacitive element 120 and an inverting amplifier 220. A switch 110 controls the connection between the vertical signal line 30 and the capacitive element 120 in accordance with a control signal Smp_n. The inverting amplifier 220 can be formed by a combination of a grounded source circuit and a source follower circuit. The inverting amplifier 220 includes transistors 130, 140, 150, 160, and 230, switches 170, 180, and 190, and a current source 200. The switch 170 is connected between the input and output of the grounded source circuit including the transistors 130, 140, 150, and 160, and controlled by a control signal Smpa_n. The reset signal is output from the inverting amplifier 220 in accordance with a control signal Hold_n. Similarly, the reset signal can be output from the sample hold circuit 212 arranged in correspondence with the vertical signal line 31.

The sample hold circuit 211 can have an arrangement similar to the arrangement of the hold circuit 210 for sampling and holding the reset signal, but switches 112 and 192 and a capacitive element 122 are added, as will be described later. The sample hold circuit 211 includes a capacitive element 121, the capacitive element 122, and an inverting amplifier 221. A switch 111 and the switch 112 respectively control the connection between the vertical signal line 30 and the capacitive elements 121 and 122 in accordance with control signals Smp_s1 and Smp_s2. The inverting amplifier 221 can be formed by a combination of a grounded source circuit and a source follower circuit.

The inverting amplifier 221 includes transistors 131, 141, 151, 161, and 231, switches 171, 181, and 191, the switch 192, and a current source 201. The switch 171 is connected between the input and output of the grounded source circuit formed by the transistors 131, 141, 151, and 161, and controlled by a control signal Smpa_s. The data signal is output from the inverting amplifier 221 in accordance with a control signal Hold_s1 or Hold_s2. The sample hold circuit 213 arranged in correspondence with the vertical signal line 31 can operate similarly.

As shown in FIG. 3, resistor elements 240 and 241 are arranged between the output terminals of the sample hold circuits 210 and 212 and the output terminals of the sample hold circuits 211 and 213, respectively. Hence, a current I flowing through each of the resistor elements 240 and 241 is expressed as:

$$I = (Vn - Vs)/R \quad (1)$$

Here, let Vn be the potential at the output terminal of each of the sample hold circuits 210 and 212, that is, the potential of the reset signal, Vs be the potential at the output terminal of each of the sample hold circuits 211 and 213, that is, the potential of the data signal, and R be the resistance value of the resistor elements 240 and 241.

The current I is input to the converter 60 via the multiplexer 70. At this time, since the current I flowing through each of the resistor elements 240 and 241 is proportional to the difference between the potential Vn of the reset signal of the pixel and the potential Vs of the data signal, correlated double sampling (CDS) is performed at the stage in which the current I is input to the converter 60.

The multiplexer 70 includes switches 500 and 510, and connects one of the sample hold circuits 50 and 51 to the converter 60 in accordance with control signals Mux1 and Mux2.

The converter 60 as a ΔΣ A/D conversion circuit includes a first integrator, a second integrator, a quantizer 370, and a decimation filter 380. In the converter 60, the first integrator is formed by an integral capacitor 320. The second integrator is formed by a voltage-current converter Gm 330, which converts a voltage into a current, and an integral capacitor 360. A digital-analog converter 305 including a current source 300 and a switch 310 is connected the input node of the first integrator.

In accordance with a digital signal via the second integrator and the quantizer 370, the digital-analog converter 305 controls the current to the first integrator. A digital-analog converter 345 including a current source 340 and a switch 350 is connected to the input node of the second integrator. The digital-analog converter 345 controls the current to the second integrator in accordance with the result obtained by quantizing the output of the second integrator by the quantizer 370. Note that, as shown in FIG. 3, a clock signal Clk is input to the quantizer 370, and the quantization operation is performed in synchronization with the clock signal Clk.

In the converter 60, an operation of feeding back the quantization value precedingly quantized by the quantizer 370 to the second integrator and the first integrator through the digital-analog converters 305 and 345 is performed. In this manner, by passing the preceding quantization value through the integrators twice while feeding it back to the digital-analog converters 305 and 345, a secondary noise shaping characteristic can be obtained.

Furthermore, by removing high-frequency noise by the decimation filter 380 arranged at the succeeding stage of the quantizer 370, an accurate analog-digital conversion output can be obtained. Note that, as shown in FIG. 3, a switch 390 is connected between the inverting input terminal and output of the voltage-current converter Gm 330, and controlled by a control signal Adres. By turning on the switch 390, each node of the first integrator and the second integrator can be set in a reset state.

Figure 4:
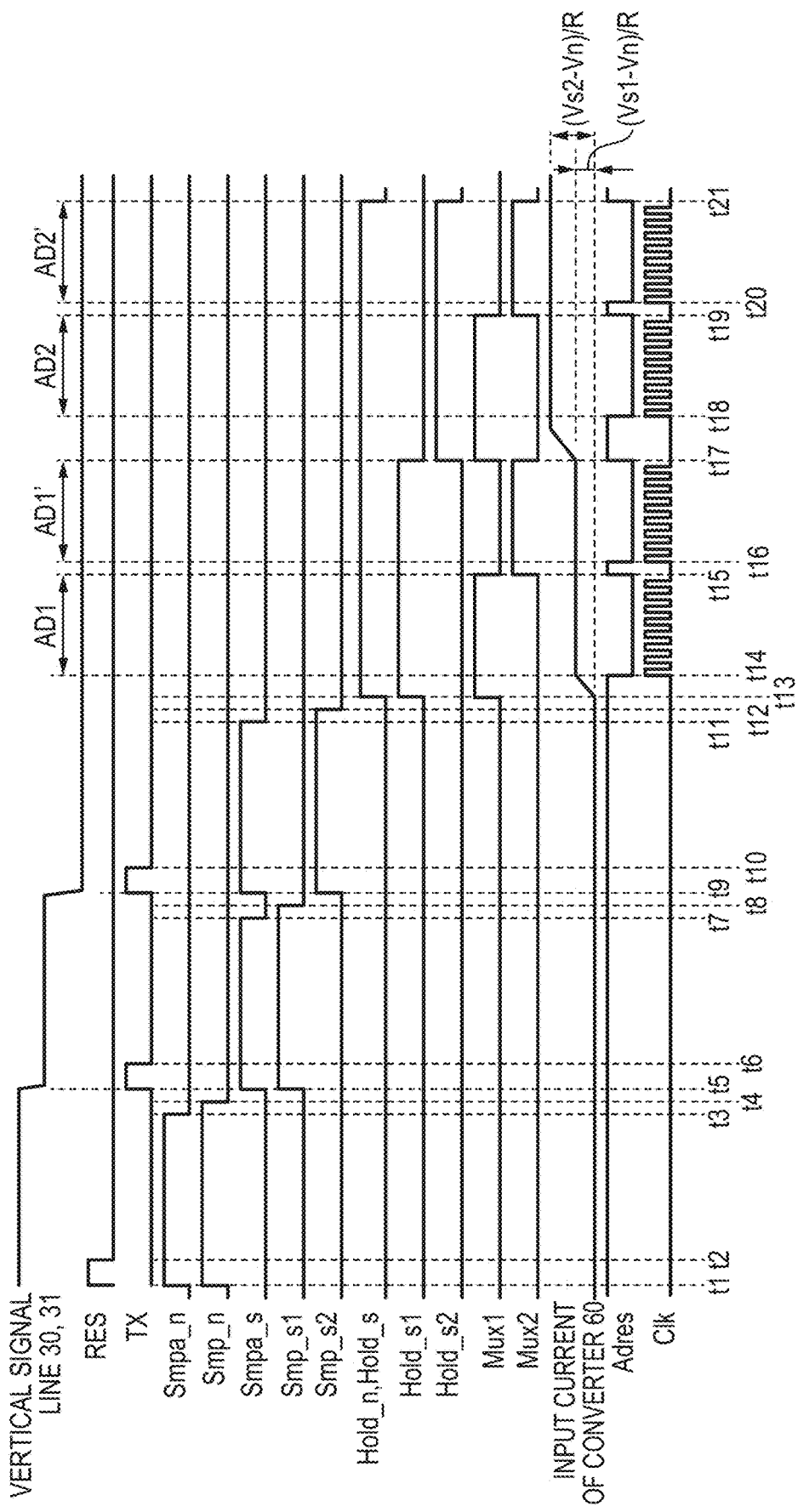
FIG. 4 is a timing chart of the photoelectric conversion apparatus according to the first embodiment.

FIG. 4 is a timing chart showing an example of operations of the respective switches of the sample hold circuits 210 and 211, the multiplexer 70, and the converter 60. FIG. 4 shows the control signals RES and TX of the pixel 10 and the input current of the converter 60. The control signals Smp_n, Smpa_n, Hold_n, Hold_s, Smp_s1, Smp_s2, Smpa_s, Hold_s1, and Hold_s2 of the respective switches of the sample hold circuits 210 and 211 are also shown. The control signals Mux1 and Mux2 of the multiplexer 70, the control signals Adres and Clk of the converter 60, and the input analog current signal of the converter 60 are further shown.

A description will be given assuming that, in FIG. 4, while the control signal is at high level, the corresponding switch is in the ON state (conductive state), and while the control signal is at low level, the corresponding switch is in the OFF state (non-conductive state).

In the period from time t1 to time t2, the control signal RES shown in FIG. 2 is set at high level and the reset transistor 455 is turned on to reset the potential of the floating diffusion 420. Accordingly, the potential of the vertical signal line 30 is set at the level of the reset signal. In addition, at time t1, the control signals Smp_n and Smpa_n are set at high level, and the switches 110 and 170 are turned on in the sample hold circuit 210 for sampling and holding the reset signal. Then, at time t3 when the control signal Smpa_n transitions from high level to low level, the potential Vn of the reset signal is sampled and held in the capacitive element 120. Then, at time t4, the control signal Smp_n transitions from high level to low level, and the switch 110 is turned off and disconnected from the vertical signal line 30. A similar operation is performed in the vertical signal line 31 and the sample hold circuit 212 for sampling and holding the reset signal.

Note that, in the period from time t1 to time t4, the control signals Mux1 and Mux2 are at low level, and both the sample hold circuits 211 and 213 are not connected to the converter 60. Therefore, the input current to the converter 60 is at zero. Furthermore, the control signal Adres is at high level and the switch 390 is in the ON state, and each node of the first integrator and the second integrator is in the reset state in the converter 60. The clock signal Clk is not input, and the quantizer 370 is in a state of not performing the quantization operation.

In the period from time t5 to time t6, the control signal TX shown in FIG. 2 is set at high level and the transfer transistor 410 is turned on, so that the charges generated by light irradiation in the period from time t2 to time t6 are transferred from the photoelectric conversion element 400 to the floating diffusion 420. The potential of the floating diffusion 420 decreases in accordance with the amount of transferred charges. Accordingly, the potential of the vertical signal line 30 decreases to the level of the first data signal. In addition, at time t5, the control signals Smpa_s and Smp_s1 are set at high level, and the switches 111 and 171 are turned on in the sample hold circuit 211 for sampling and holding the data signal.

Then, at time t7 when the control signal Smpa_s transitions from high level to low level, a potential Vs1 of the first data signal is sampled and held in the capacitive element 121. Then, at time t8, the control signal Smp_s1 transitions from high level to low level, and the switch 111 is turned off to disconnect the capacitive element 121 from the vertical signal line 30. A similar operation is performed in the vertical signal line 31 and the sample hold circuit 213 for sampling and holding the data signal.

Note that the voltage across the switch 171 upon turning off the switch 171 at time t7 is always approximately the same regardless of the potential of the vertical signal line 30. Therefore, an error voltage is not generated with respect to the potential Vs1 of first data signal held in the capacitive element 121 by charge injection caused by turning off the switch 171. Further, when turning off the switch 111 at time t8, since both ends of the capacitive element 121 are in a high impedance state, there is no influence caused by turning off the switch 111. In tins manner, generation of an error voltage with respect to the potential Vs1 of the first data signal can be suppressed.

In the period from time t9 to time t10, the control signal TX shown in FIG. 2 is set at high level again, and the transfer transistor 410 is turned on. With this, the charges accumulated in the photoelectric conversion element 400 by light irradiation in the period from time t6 to time t10 are additionally transferred to the floating diffusion 420. The potential of the floating diffusion 420 further decreases in accordance with the amount of the charges. Accordingly, the potential of the vertical signal line 30 decreases to the level of the second data signal.

In addition, at time t9, the control signals Smpa_s and Smp_s2 are set at high level, and the switches 112 and 171 are turned on in the sample hold circuit 211 for sampling and holding the data signal. Then, at time t11 when the control signal Smpa_s transitions from high level to low level, a second data signal Vs2 is sampled and held in the capacitive element 122. Then, at time t12, the control signal Smp_s2 transitions from high level to low level, and the switch 112 is turned off to disconnect the capacitive element 122 from the vertical signal line 30. A similar operation is performed in the vertical signal line 31 and the sample hold circuit 213 for sampling and holding the data signal.

Note that the voltage across the switch 171 upon turning off the switch 171 at time t11 is always approximately the same regardless of the potential of the vertical signal line 30. Therefore, an error voltage is not generated with respect to the second data signal Vs2 held in the capacitive element 122 by charge injection caused by turning off the switch 171. Further, when turning off the switch 112 at time t12, since both ends of the capacitive element 122 are in a high impedance state, there is no influence caused by turning off the switch 112. In tins manner, generation of an error voltage with respect to the second data signal Vs2 can be suppressed.

At time t13, the control signal Hold_n is set at high level and the switches 180 and 190 are turned on, so that the potential Vn of the reset signal held by the capacitive element 120 is output in the sample hold circuit 210. A similar operation is performed in the sample hold circuit 212. Simultaneously, at time t13, the control signals Hold_s1 and Hold_s are also set at high level and the switches 181 and 191 are turned on, so that the potential Vs1 of the first data signal held by the capacitive element 121 is output in the sample hold circuit 211. A similar operation is performed in the sample hold circuit 213. Simultaneously, at time t13, the control signal Mux1 is also set at high level, so that the sample hold circuit 211 is connected to the converter 60 and the input current to the converter 60 increases.

As has been described above, the input current to the converter 60 is a current corresponding to the difference between the potential Vn of the reset signal at the output terminal of the sample hold circuit 210 and the potential Vs1 of the first data signal at the output terminal of the sample hold circuit 211. The converter 60 perform analog-digital conversion of this current.

At time t14, the control signal Adres is set at low level, the switch 390 is turned off, and the reset state of each node of the first integrator and the second integrator is canceled. Then, in the period from time t14 to time t15 (period AD1), the clock signal Clk is input, and a quantization operation is performed by the quantizer 370 in each clock cycle. As has been described above, by passing the preceding quantization value through the integrators twice while feeding it back to the digital-analog converters 305 and 345 in each clock cycle, a secondary noise shaping characteristic can be obtained.

Furthermore, by removing high-frequency noise by the decimation filter 380 arranged at the succeeding stage of the quantizer 370, an accurate analog-digital conversion output can be obtained. At time t15, along with completion of the analog-digital conversion of the signal corresponding to the potential Vs1 of the first data signal of the sample hold circuit 211, the control signal Mux1 is set at low level, and the control signal Mux2 is set at high level to connect the sample hold circuit 213 to the converter 60. Then, in the period from time t15 to time t16, the control signal Adres is set at high level and the switch 390 is turned on, so that the reset state of each node of the first integrator and the second integrator is reset. In the period from time t16 to time t17 (period AD1'), similarly, the analog-digital conversion of the signal corresponding to the potential Vs1 of the first data signal of the sample hold circuit 213 is performed. In this manner, the first data signal from the sample hold circuit 211 and the first data signal from the sample hold circuit 213 sequentially undergo analog-digital conversion in the period AD1 and the period AD1'.

At time t17, the control signal Mux1 is set at high level and the control signal Mux2 is set at low level to connect the sample hold circuit 211 to the converter 60. In addition, at time t17, the control signal Hold_s1 is set at low level and the switch 191 is turned off. Thereafter, when the control signal Hold_s2 is set at high level and the switch 192 is turned on at time t17, the potential Vs2 of the second data signal is output from the capacitive element 122 of the sample hold circuit 211. With this, a current corresponding to the difference between the potential Vn of the reset signal at the output terminal of the sample hold circuit 210 and the potential Vs2 of the second data signal at the output terminal of the sample hold circuit 211 is input to the converter 60.

The converter 60 performs analog-digital conversion of the signal from the sample hold circuit. Here, the potential Vs1 of the first data signal and the potential Vs2 of the second data signal are signals accumulated in different exposure times of the photoelectric conversion element, that is, signals each corresponding to the charge accumulation time of the photoelectric conversion element. Therefore, the potentials are not the same except for a dark state where exposure is not performed. Accordingly, at time t17, the voltage across the resistor element 240 can change. In accordance with this, the input current to the converter 60 starts to increase at time t17. It has been found that, due to reasons such as the time required for the settlement of the voltage across the resistor element 240, a certain amount of time is required for the settlement of this current. If analog-digital conversion is started before the settlement, an error occurs and the linearity characteristic is deteriorated.

To prevent this, in FIG. 4, in order to wait for the settlement, the time interval between time t17 and time t18 is set longer than the time interval between time t15 and time t16. That is, the time longer than the time interval between the periods required for the analog-digital conversion of the signals of the same accumulation time is set. With this, deterioration of the linearity characteristic is suppressed. In the period from time t18 to time t19 (period AD2), analog-digital conversion of the signal corresponding to the potential Vs2 of the second data signal of the sample hold circuit 211 is performed as in the above description. Further, in the period from time t20 to time t21 (period AD2'), analog-digital conversion of the signal corresponding to the potential Vs2 of the second data signal of the sample hold circuit 213 is performed. In this manner, the second data signal from the sample hold circuit 211 and the second data signal from the sample hold circuit 213 sequentially undergo analog-digital conversion. At this time, the time interval between time t17 and time t18 may be set longer than the time interval between time t19 and time t20.

In this manner, in this embodiment, when reading out two kinds of signals, it is possible to suppress deterioration of the accuracy of analog-digital conversion due to the influence of the time required for the settlement of the voltage across each of the resistor elements 240 and 241 which perform voltage-current conversion. Note that the resistor elements 240 and 241 may be variable resistors. That is, a variable current configuration may be used. As can be seen from equation (1), the current change at time t17 can be larger if the resistance is low. Accordingly, in a case where the values of the resistor elements 240 and 241 are low, the effect of this embodiment can be more conspicuous.

Since the sample hold circuit 211 includes the capacitive elements 121 and 122, it is possible to read out two data signals Vs1 and Vs2 without increasing the operating power. Further, as has been described above, the error voltage can be suppressed with respect to the potential Vs1 and the potential Vs2, so that degradation of the image quality in high dynamic range (HDR) image capturing can be suppressed.

Furthermore, since the potential Vs1 of the first signal and the potential Vs2 of the second signal are input as currents to the convertor 60 via the common resistor elements 240 and 241, fluctuations caused by temperature and process variations are easily synchronized. With this, for example, degradation of the image quality of an HDR image caused by different variations superimposed on the data signals Vs1 and Vs2 can be suppressed.

Figure 5:
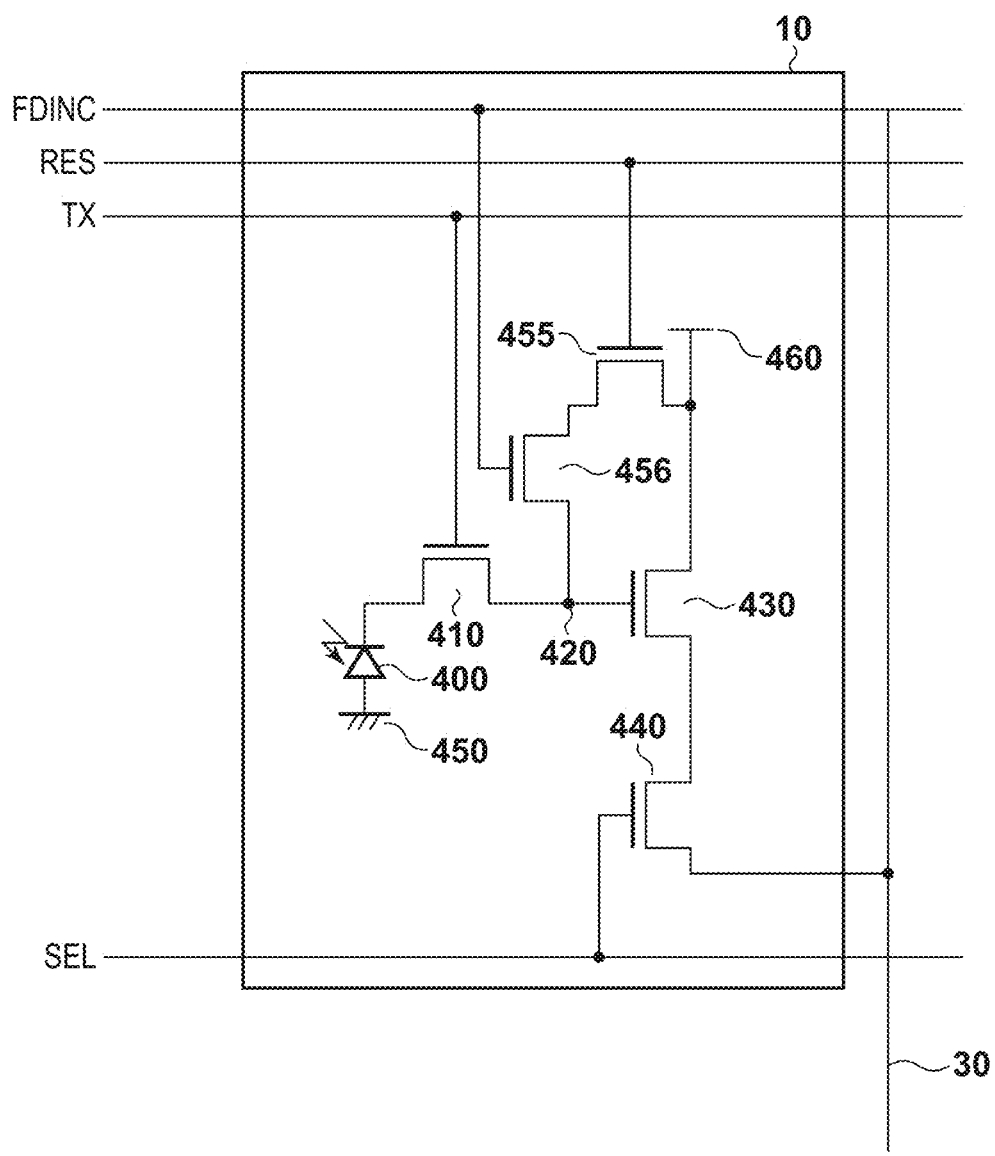
FIG. 5 is a view showing an example of the arrangement of the pixel.

Note that, as shown in FIG. 5, the pixel 10 may include a transistor 456 that switches the capacitance of the floating diffusion 420. By switching ON/OFF of the transistor 456 during the readout period (for example, time t9 in FIG. 4), the capacitance of the floating diffusion 420 is changed. At this time, the transistor 456 functions as a gain changing portion for changing the capacitance of the floating diffusion. Alternatively, another capacitive element may be connected to the floating diffusion via a transistor, and the capacitance may be changed by switching ON/OFF of the transistor. With the gain changing portion, signals having different voltage conversion gains can be output to and held by the capacitive elements 121 and 122, respectively. It becomes possible to perform HDR image capturing while using signals having different voltage gains.

Second Embodiment

Figure 6:
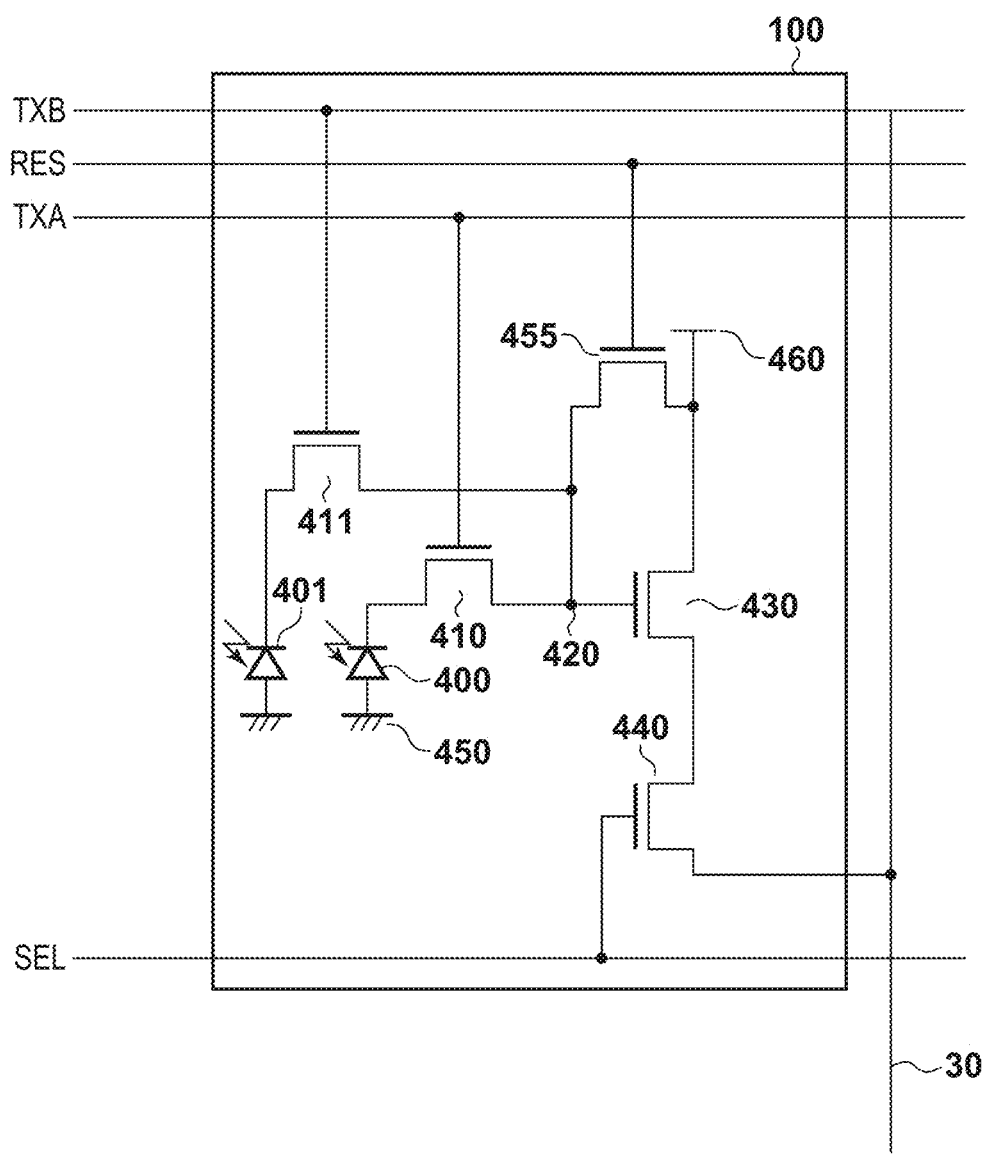
FIG. 6 is a view showing an example of the arrangement of a pixel according to the second embodiment.
Figure 7:
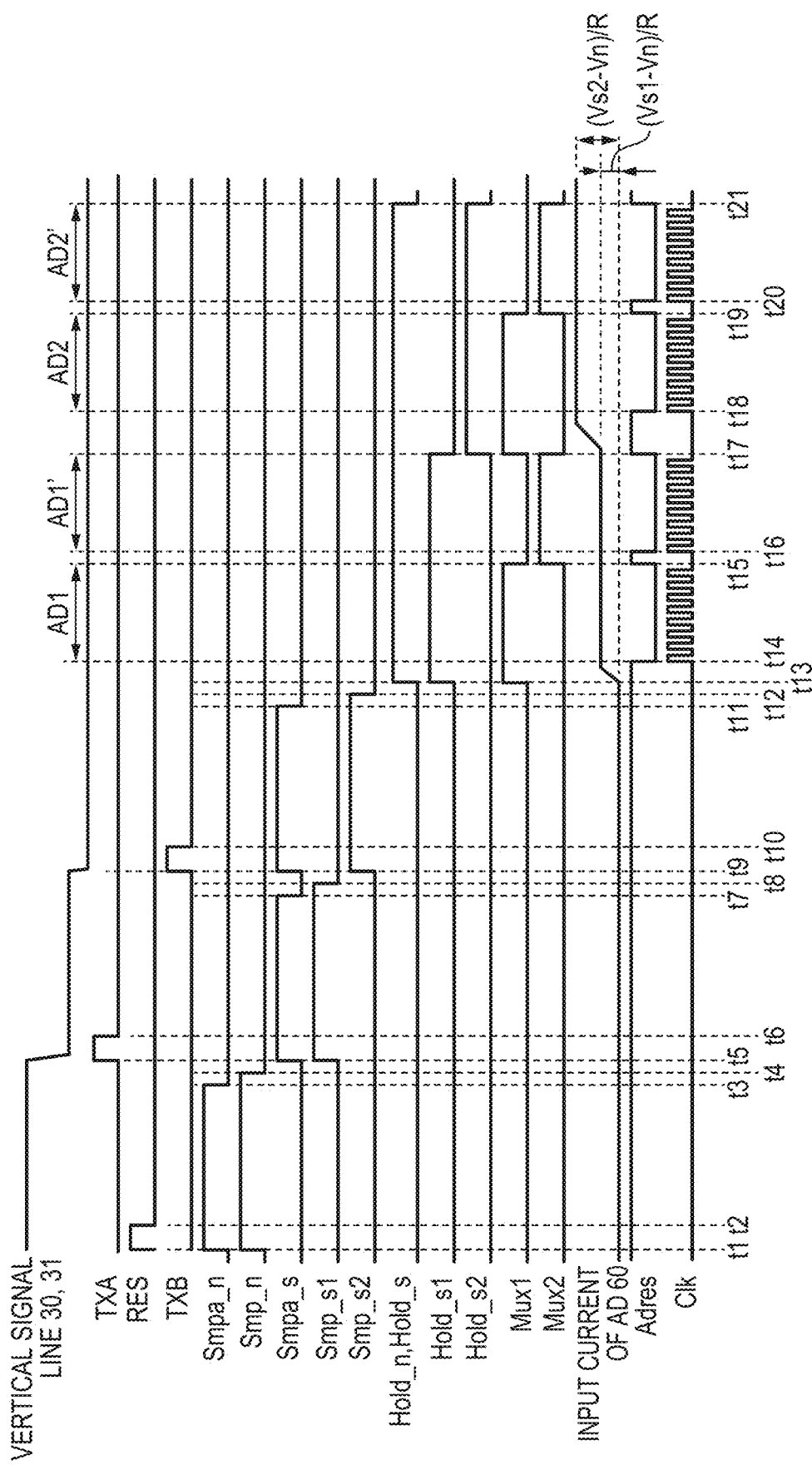
FIG. 7 is a timing chart of a photoelectric conversion apparatus according to the second embodiment.

FIG. 6 is a schematic view showing a photoelectric conversion apparatus according to the second embodiment, and FIG. 7 is a timing chart of the photoelectric conversion apparatus. Only points different from FIGS. 2 and 4 of the first embodiment will be described below. In FIG. 6, a pixel 10 further includes a photoelectric conversion element 401 and a transfer transistor 411. In FIG. 6, the pixel 10 is formed such that two photoelectric conversion elements 400 and 401 share a floating diffusion. The pixel shown in FIG. 6 is a so-called floating diffusion sharing pixel. The photoelectric conversion elements 400 and 401 are, for example, photodiodes. The pixel 10 in FIG. 6 can be, for example, a pixel corresponding to two pixels in the vertical direction. In this embodiment, signals of the photoelectric conversion elements 400 and 401 are held by and output to capacitive elements 121 and 122 shown in FIG. 3, respectively. Thus, pixel signals for two rows can be read out in a unit readout period, and the readout speed can be increased.

In the timing chart of FIG. 7, in the period from time t5 to time t6, a control signal TXA shown in FIG. 6 is set at high level and a transfer transistor 410 is turned on, so that charges are transferred from the photoelectric conversion element 400 to a floating diffusion 420. In the period from time t5 to time t8, a first signal based on the charges of the photoelectric conversion element 400 is held by the capacitive element 121 shown in FIG. 3. In the period from time t9 to time t10, a control signal TXB shown in FIG. 6 is set at high level and the transfer transistor 411 is turned on, so that charges are transferred from the photoelectric conversion element 401 to the floating diffusion 420. In the period from time t9 to time t12, a second signal based on the charges of the photoelectric conversion elements 400 and 401 is held by the capacitive element 122 shown in FIG. 3. In the period from time t13 to time t17, the difference signal between the first signal and the reset signal undergoes analog-digital conversion, and in the period from time t18 to time t21, the difference signal between the second signal and the reset signal undergoes analog-digital conversion. By calculating the difference between two signals at the succeeding stage, a digital signal for each of the photoelectric conversion elements 400 and 401 can be obtained. With the operation as described above, pixel signals for two rows can be read out in a unit readout period, and the readout speed can be increased.

Here, as in the first embodiment, the time interval between time t17 and time t18 may be set longer than the time interval between time t15 and time t16. With this, deterioration of the accuracy of analog-digital conversion in analog-digital conversion of the second signal is suppressed.

Note that, in FIG. 7, the photoelectric conversion elements 400 and 401 may be a pair of photoelectric conversion elements formed under the same microlens, thereby forming a phase difference detection pixel. In this case, the first signal can be used as a focus detection signal. The focus detection signal enables auto focus (AF) detection. At this time, the second signal serves as an image signal. In this case, the image quality can be improved by suppressing deterioration of the accuracy of analog-digital conversion of the second signal. In addition, the accuracy of the auto focus (AF) signal, which is obtained from the difference between the first signal and the second signal and used together with the first signal for focus detection, can also be improved. Accordingly, the AF accuracy can be improved.

Note that, in FIG. 7, a case where the first data signal first undergoes analog-digital conversion is taken as an example and described, but the present invention is not limited to this. The second data signal may first undergo analog-digital conversion. In this case, since the image signal undergoes analog-digital conversion before the AF signal, the holding time of the image signal by the sample hold circuit can be decreased. With this, it is possible to reduce the influence of leakage, low-frequency power supply noise, or the like, thereby improving the image quality.

The range of the signal amplitude of the first data signal corresponding to one photodiode serving as the photoelectric conversion element is smaller than the range of the signal amplitude of the second data signal corresponding to two photoelectric conversion elements. This is because two photoelectric conversion elements can hold a larger amount of charges.

In FIG. 7, the photoelectric conversion elements 400 and 401 may be photodiodes having different areas. Since a large photodiode and a small photodiode can hold different amounts of charges, they output signals having different ranges of the signal amplitudes, as in the example of the phase difference detection pixel described above.

As shown in FIG. 5, the pixel 10 can include the transistor 456 for switching the capacitance of the floating diffusion. In this case, if ON/OFF of the transistor 456 is switched during a readout period to read out signals having different voltage conversion gains, the ranges of the signal amplitudes can be different from each other. This is caused by, for example, a difference between the thresholds of the reset transistor 455 and the transistor 456. If the threshold of the reset transistor 455 is relatively high, when the transistor 456 is in the ON state, the voltage conversion gain becomes low and the range of the signal amplitude can be increased. This is because the potential of the floating diffusion 420 can be decreased from the reset level to a lower level.

In the embodiment described above, a case where both the capacitive elements 121 and 122 hold data signals has been taken as an example and described, but the present invention is not limited to this. For example, the capacitive element 121 may hold the reset signal, and the capacitive element 122 may hold the data signal. Then, two reset signals may undergo analog-digital conversion in the period from time t13 to time t17 in FIG. 4, and two data signals may undergo analog-digital conversion in the period from time t18 to time t21. In this case, since a suspicious change appears at time t17 due to the input current to a converter 60, the effect of the arrangement of the present invention can be obtained.

The forms of the image capturing apparatus and the photoelectric conversion apparatus are not limited to those described above. For example, the pixel 10 is not limited to the arrangement example shown in FIG. 2. If each of the vertical signal lines 30 and 31 includes a plurality of vertical signal lines in one pixel column, a plurality of selection transistors 440 may be provided. Further, the converter 60 may be formed to use a comparator including a capacitor and a switch for an auto zero operation.

<Application of Photoelectric Conversion Apparatus to Equipment>

Figure 8:
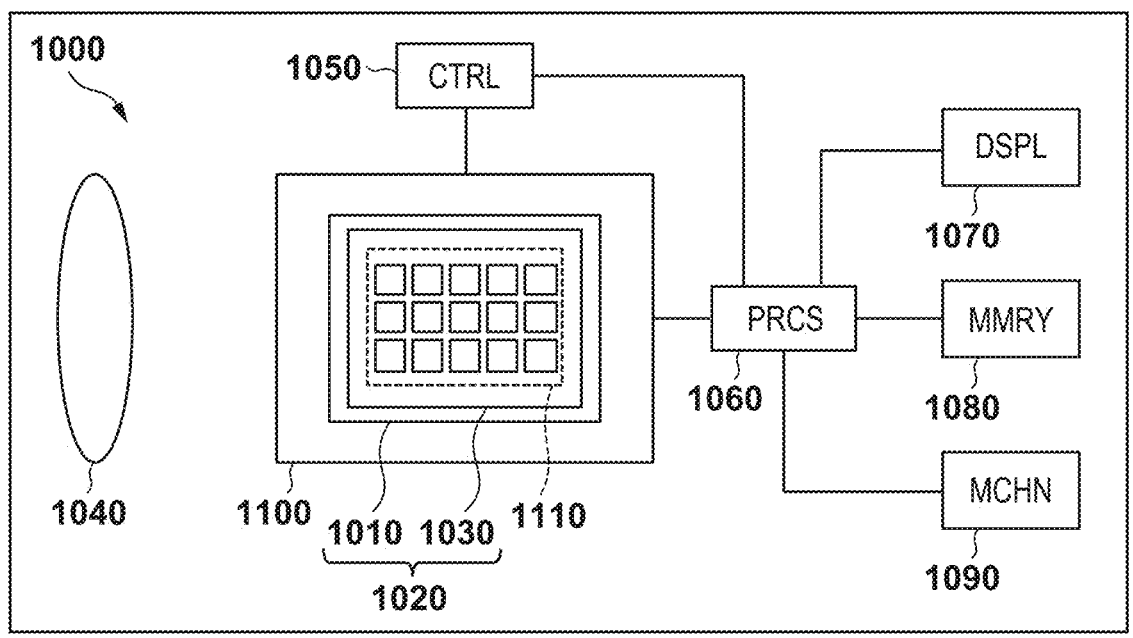
FIG. 8 is a view showing an application example of the photoelectric conversion apparatus according to the embodiment.

The following is a description of equipment 1000 that includes a semiconductor apparatus 1100 including a package 1020 on which a semiconductor chip 1110 including a semiconductor integrated circuit is mounted, as shown in FIG. 8. The semiconductor chip 1110 is accommodated in the package 1020 and mounted on the equipment 1000. In the arrangement shown in FIG. 8, the semiconductor chip 1110 includes the photoelectric conversion apparatus according to the embodiment described above. The semiconductor apparatus 1100 can include the package 1020 including a base 1010 on which the semiconductor chip 1110 is fixed and a light transmissive member 1030 such as glass that faces the semiconductor chip 1110. The package 1020 can be provided with joining members such as wires and bumps that connect inner leads provided on the base 1010 to terminals such as pad electrodes provided on the semiconductor chip 1110.

The equipment 1000 can include at least one of an optical apparatus 1040, a control apparatus 1050, a processing apparatus 1060, a display apparatus 1070, a storage apparatus 1080, and a mechanical apparatus 1090. The optical apparatus 1040 is implemented by, for example, a lens, a shutter, and a mirror. The control apparatus 1050 controls the semiconductor chip 1110. The control apparatus 1050 is, for example, a semiconductor device such as an ASIC.

The processing apparatus 1060 processes a signal output from the photoelectric conversion apparatus included in the semiconductor chip 1110. The processing apparatus 1060 is a semiconductor device such as a CPU or an ASIC for forming an Analog Front End (AFE) or a Digital Front End (DFE). For example, an image may be generated based on event signals. The display apparatus 1070 is an EL display device or a liquid crystal display device that displays an information image obtained by the semiconductor chip 1110. The storage apparatus 1080 is a magnetic device or a semiconductor device that stores the information image obtained by the semiconductor chip 1110. The storage apparatus 1080 is a volatile memory such as an SRAM or a DRAM, or a nonvolatile memory such as a flash memory or a hard disk drive.

The mechanical apparatus 1090 includes a moving or propulsion unit such as a motor or an engine. In the equipment 1000, the signal output from the semiconductor chip 1110 is displayed on the display apparatus 1070 or transmitted to an external apparatus by a communication apparatus (not shown) included in the equipment 1000. Hence, the equipment 1000 may further include the storage apparatus 1080 and the processing apparatus 1060 in addition to the memory circuits and arithmetic circuits included in the semiconductor chip 1110. The mechanical apparatus 1090 may be controlled based on the signal output from the semiconductor chip 1110.

In addition, the equipment 1000 is suitable for electronic equipment such as an information terminal (for example, a smartphone or a wearable terminal) which has a shooting function or a camera (for example, an interchangeable lens camera, a compact camera, a video camera, or a monitoring camera). The mechanical apparatus 1090 in the camera can drive the components of the optical apparatus 1040 in order to perform zooming, an in-focus operation, and a shutter operation. Alternatively, the mechanical apparatus 1090 in the camera can move the optical apparatus 1040 in order to perform an anti-vibration operation.

Furthermore, the equipment 1000 can be transportation equipment such as a vehicle, a ship, or an airplane. The mechanical apparatus 1090 in the transportation equipment can be used as a moving apparatus. The equipment 1000 as the transportation equipment is suitable for an apparatus that transports the semiconductor chip 1110 or an apparatus that uses a shooting function to assist and/or automate drive steering. The processing apparatus 1060 for assisting and/or automating drive steering can perform, based on the information obtained by the semiconductor chip 1110, processing for operating the mechanical apparatus 1090 as a moving apparatus. Alternatively, the equipment 1000 may be medical equipment such as an endoscope, measurement equipment such as a distance measurement sensor, analysis equipment such as an electron microscope, office equipment such as a copy machine, or industrial equipment such as a robot.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-076315 filed May 2, 2023, which is hereby incorporated by reference herein in their entirety.

What is claimed is:

1. A photoelectric conversion apparatus comprising:
a pixel region where pixels each including a photoelectric conversion element are arranged in a matrix;
a sample hold circuit configured to sample and hold, as a first signal and a second signal, two different signals output from each of two pixels in the pixel region; and
an analog-digital conversion circuit configured to perform analog-digital conversion of the second signals from the two pixels after performing analog-digital conversion of the first signals from the two pixels,
wherein a time interval between a period set to perform analog-digital conversion of the first signals from the two pixels and a period set to perform analog-digital conversion of the second signals from the two pixels is set longer than a time interval between periods set to perform analog-digital conversion of each of the first signals from the two pixels.

2. The apparatus according to claim 1, wherein
the two pixels are arranged side by side in the pixel region.

3. The apparatus according to claim 1, wherein
the first signal undergoes analog-digital conversion, and the second signal undergoes analog-digital conversion thereafter.

4. The apparatus according to claim 1, wherein
the sample hold circuit comprises a sample hold circuit configured to sample and hold a signal at a reset level.

5. The apparatus according to claim 4, wherein
a difference between the signal at the reset level and the first signal and a difference between the signal at the reset level and the second signal are output to the analog-digital conversion circuit.

6. The apparatus according to claim 1, wherein
an output of the sample hold circuit is input to the analog-digital conversion circuit via a resistor.

7. The apparatus according to claim 6, wherein
the resistor is a variable resistor.

8. The apparatus according to claim 1, wherein
the sample hold circuit includes an amplifier, and the first signal and the second signal are output from the amplifier.

9. The apparatus according to claim 8, wherein
the first signal and the second signal are held by two capacitors provided in an input section of the amplifier.

10. The apparatus according to claim 1, wherein
the analog-digital conversion circuit is a delta-sigma (42) analog-digital conversion circuit.

11. The apparatus according to claim 1, wherein
an integrator is provided in an input of the analog-digital conversion circuit.

12. The apparatus according to claim 1, wherein
a voltage-current converter is provided in the analog-digital conversion circuit.

13. The apparatus according to claim 1, wherein
a gain changing portion configured to change an output from the photoelectric conversion element is provided in the pixel.

14. The apparatus according to claim 1, wherein
a time interval between a period set to perform analog-digital conversion of the first signals from the two pixels and a period set to perform analog-digital conversion of the second signals from the two pixels is set longer than a time interval between periods set to perform analog-digital conversion of each of the second signals from the two pixels.

15. Equipment comprising:
a photoelectric conversion apparatus defined in claim 1; and
a processing apparatus configured to process an output signal from the photoelectric conversion apparatus.

16. A photoelectric conversion apparatus comprising:
a pixel region where pixels each including a photoelectric conversion element are arranged in a matrix;
a sample hold circuit configured to sample and hold, as a first signal and a second signal having a longer exposure time than the first signal, two signals output from each of two pixels in the pixel region; and
an analog-digital conversion circuit configured to perform analog-digital conversion of the second signals from the two pixels after performing analog-digital conversion of the first signals from the two pixels,
wherein a time interval between a period set to perform analog-digital conversion of the first signals from the two pixels and a period set to perform analog-digital conversion of the second signals from the two pixels is set longer than a time interval between periods set to perform analog-digital conversion of each of the first signals from the two pixels.

17. The apparatus according to claim 16, wherein
the pixel includes a first photoelectric conversion element and a second photoelectric conversion element, the first signal is a signal from the first photoelectric conversion element, and the second signal is a signal from the first photoelectric conversion element and the second photoelectric conversion element.

18. The apparatus according to claim 17, wherein
the first signal is a focus detection signal, and the second signal is an image signal.

* * * * *